(12) United States Patent
Liu et al.

(10) Patent No.: US 7,602,966 B2
(45) Date of Patent: Oct. 13, 2009

(54) IMAGE PROCESSING METHOD, IMAGE PROCESSING APPARATUS, PROGRAM AND RECORDING MEDIUM

(75) Inventors: Yuyu Liu, Tokyo (JP); Weiguo Wu, Tokyo (JP)

(73) Assignee: Sony Corporation, Tokyo (JP)

( * ) Notice: Subject to any disclaimer, the term of this patent is extended or adjusted under 35 U.S.C. 154(b) by 765 days.

(21) Appl. No.: 11/370,051

(22) Filed: Mar. 8, 2006

(65) Prior Publication Data

US 2006/0204104 A1     Sep. 14, 2006

(30) Foreign Application Priority Data

Mar. 11, 2005  (JP)  ............................ P2005-069358
Jan. 25, 2006  (JP)  ............................ P2006-016702

(51) Int. Cl.
    *G06K 9/00*     (2006.01)
(52) U.S. Cl. .................................................. 382/154
(58) Field of Classification Search ........................ None
    See application file for complete search history.

(56) References Cited

U.S. PATENT DOCUMENTS

| 6,519,358 | B1  | 2/2003  | Yokoyama |
| 6,526,157 | B2  | 2/2003  | Hayashi |
| 6,590,573 | B1* | 7/2003  | Geshwind .................... 345/419 |
| 6,625,301 | B2  | 9/2003  | Hayashi |
| 6,801,653 | B1  | 10/2004 | Wu et al. |
| 7,321,386 | B2* | 1/2008  | Mittal et al. ................. 348/169 |
| 2003/0179198 | A1* | 9/2003  | Uchiyama .................... 345/427 |
| 2005/0129325 | A1  | 6/2005  | Wu |

OTHER PUBLICATIONS

U.S. Appl. No. 09/462,345, filed May 7, 1999.
Yuri Boykv et al., "Fast Approximate Energy Minimization via Graph Cuts", International Conference on Computer vision, vol. 1, pp. 377 to 384, 1999.
V. Lolmogorov et al., "Computing Visual Correspondence with Occlusuions Using Graph Cuts", Journal of Confidence on Computer Vision, vol. 2, pp. 508 to 515, 2001.
Geoffrey Egnal, "Mutual Information as a Stereo Correspondence Measure", Technical Report MS-CIS-00-20, University of Pennsylvania, 2000.
Junhwan Kim et al., "Visual Correspondence Using Energy Minimization and Mutual Information", International Conference on computer Vision, vol. 2, pp. 1033 to 1040, 2003.

* cited by examiner

*Primary Examiner*—Matthew C Bella
*Assistant Examiner*—Alex Liew
(74) *Attorney, Agent, or Firm*—Finnegan, Henderson, Farabow, Garrett & Dunner, L.L.P.

(57) ABSTRACT

An image processing method and apparatus is disclosed which can produce parallax data between a plurality of image data with a high degree of accuracy. Probability density functions are updated successively, and a corresponding relationship which minimizes the energy in each of the probability density functions is specified. Then, that one of the probability density functions which finally minimizes the energy and parallax data corresponding to the correspondence relationship are specified.

17 Claims, 12 Drawing Sheets

FIG. 5
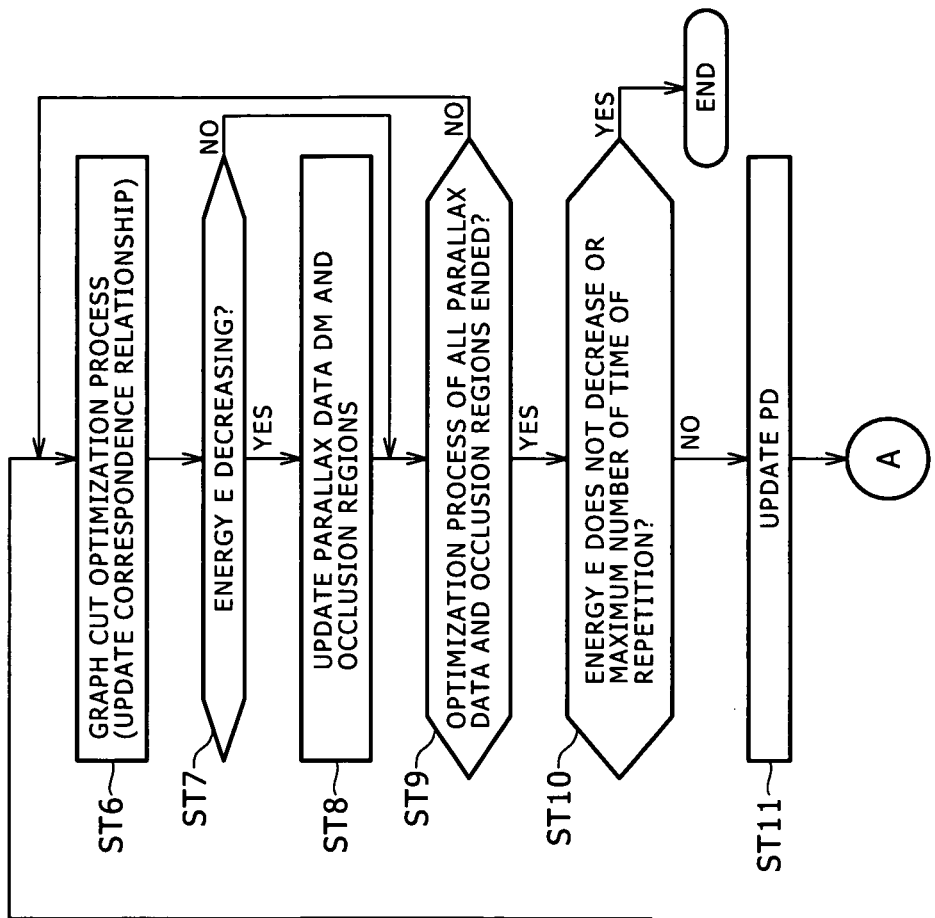
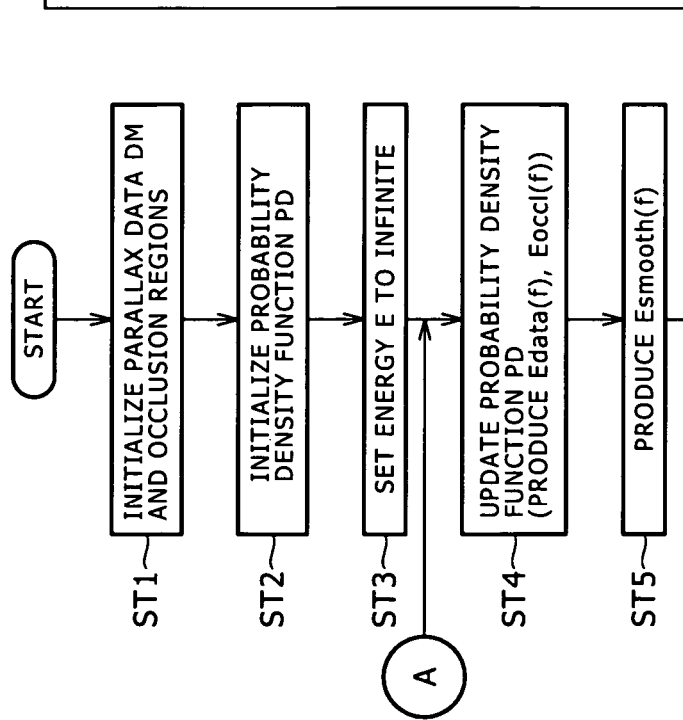

FIG. 8A

|  | Tsukuba | Sawtooth | Venus | Map |
|---|---|---|---|---|
| NON-PATENT DOCUMENT[4] | 6.39 | 3.63 | 2.37 | — |
| PRESENT EMBODIMENT | 1.83 | 1.55 | 1.98 | 0.43 |

FIG. 8B

|  | Tsukuba | Sawtooth | Venus | Map |
|---|---|---|---|---|
| NON-PATENT DOCUMENT[2] | 1.19 | 0.73 | 1.64 | 0.61 |
| PRESENT EMBODIMENT | 1.83 | 1.55 | 1.98 | 0.43 |

FIG. 9

|  | I = I/2 | I = 1.5*I + 10 | I = -256 - I | 2% GaussNoise | Resize |
|---|---|---|---|---|---|
| NON-MI | 34.95 | 32.92 | 100.00 | 1.58 | 1.42 |
| MI | 1.90 | 1.76 | 1.90 | 2.00 | 3.70 |

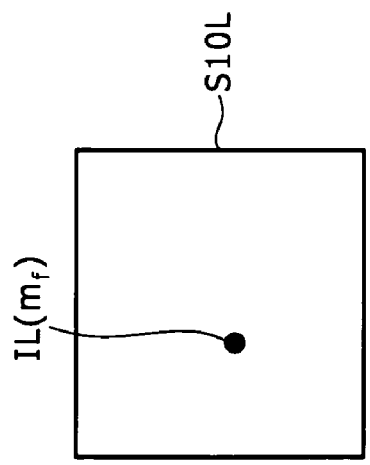
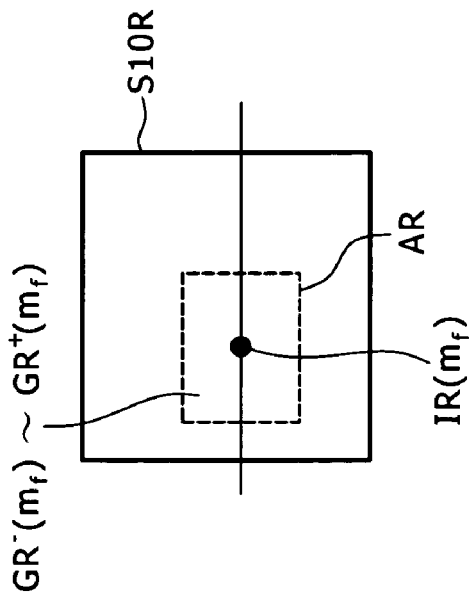
FIG. 11A
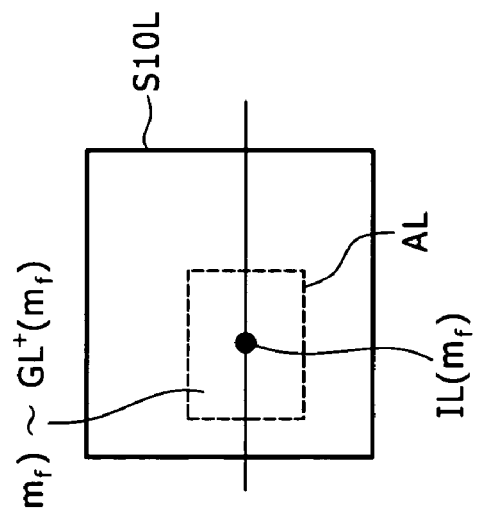
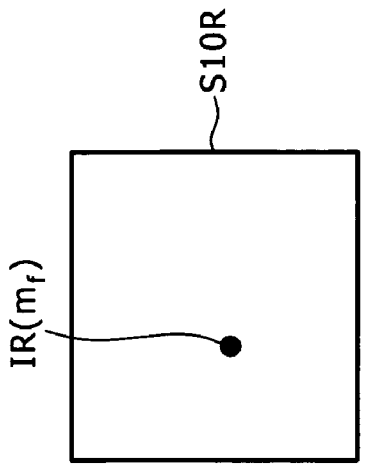
FIG. 11B

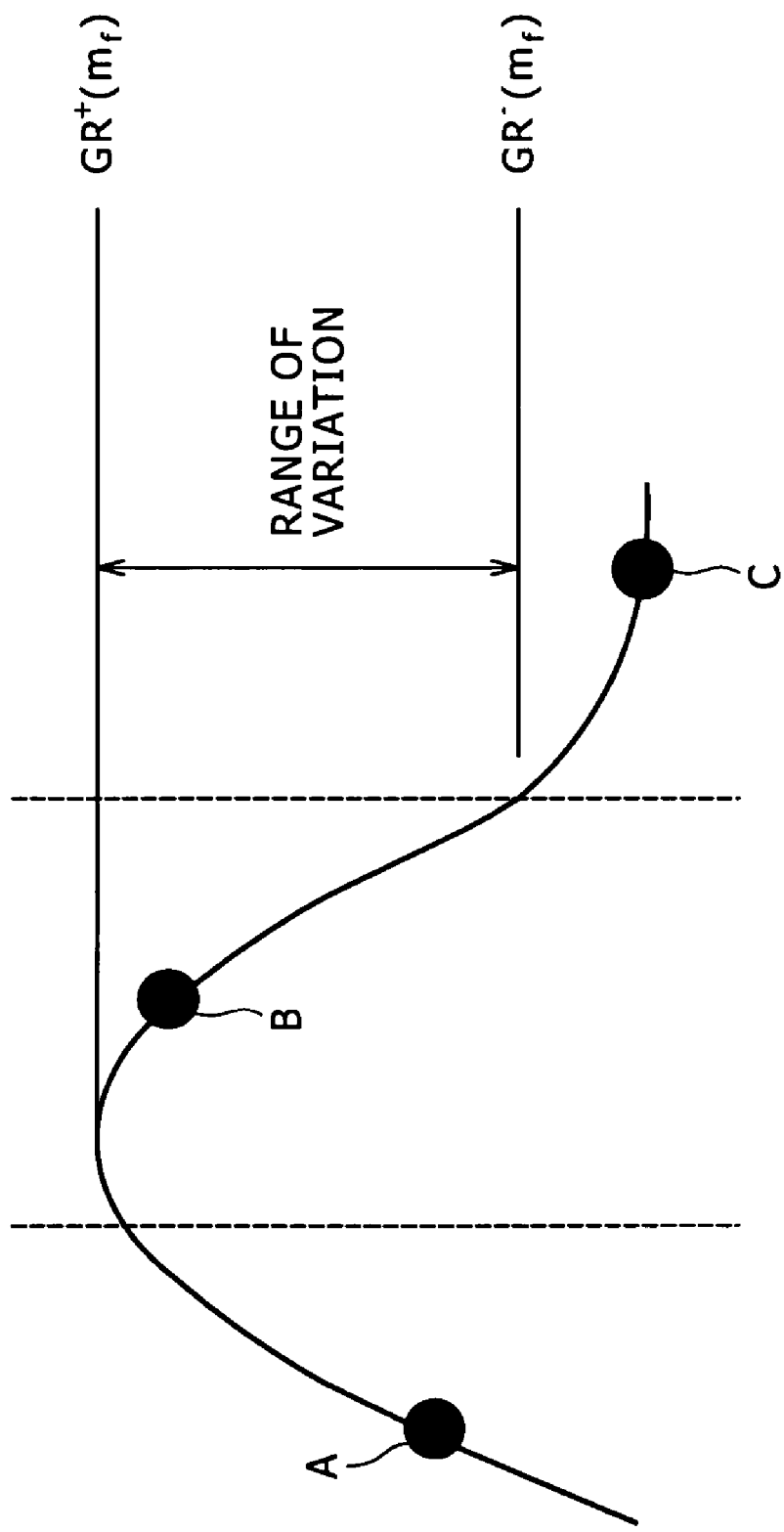

IMAGE PROCESSING METHOD, IMAGE PROCESSING APPARATUS, PROGRAM AND RECORDING MEDIUM

CROSS REFERENCES TO RELATED APPLICATIONS

The present invention contains subject matter related to Japanese Patent Application JP 2005-069358 filed with the Japanese Patent Office on Mar. 11, 2005 and Japanese Patent Application JP 2006-016702 filed with the Japanese Patent Office on Jan. 25, 2006, the entire contents of which being incorporated herein by reference.

BACKGROUND OF THE INVENTION

This invention relates to an image processing method, an image processing apparatus, a program and a recording medium which involve production of parallax data of a stereo image.

For example, stereo matching is used to specify a correspondence relationship in a unit of a pixel between two images obtained by image pickup of the same subject from different positions and produce a three-dimensional configuration of the original image required for machine sensing or virtual viewing based on parallax data obtained from the specified correspondence relationship.

However, it is not easy to specify such a correspondence relationship as described above from the ambiguity or complicatedness of the actual environment.

In conventional stereo matching, the correspondence relationship is specified based on a premise that, for example, pixel data in two images for the same subject have an equal luminance.

Related arts are disclosed, for example, Yuri Boykv, Olga Veksler, and Ramin Zabih, "Fast Approximate Energy Minimization via Graph Cuts", International Conference on Computer Vision, Vol. 1, pp. 377 to 384, 1999 (hereinafter referred to as Non-Patent Document 1), V. Lolmogorov and R. Zabih, "Computing visual correspondence with occlusions using graph cuts", Journal of Confidence on Computer Vision, Vol. 2, pp. 508 to 515, 2001 (hereinafter referred to as Non-Patent Document 2), Geoffrey Egnal, "Mutual information as a stereo correspondence measure", Technical Report MS-CIS-00-20, University of Pennsylvania, 2000 (hereinafter refereed to as Non-Patent Document 3), and Junhwan Kim, Vladimir Kolmogorov and Ramin Zabih, "Visual Correspondence Using Energy Minimization and Mutual Information", International Conference on Computer Vision, vol. 2, pp. 1033 to 1040, 2003 (hereinafter referred to as Non-Patent Document 4).

SUMMARY OF THE INVENTION

However, while the conventional techniques described above use the premise that pixel data in two images for the same subject have an equal luminance, this premise is not satisfied in many cases. Therefore, it is difficult to specify the correspondence relationship described above.

Further, according to the conventional techniques, it is estimated in a matching process to which one of a matchable region and an occlusion region each pixel data in the images belongs. Therefore, the possibility is high that wrong estimation may be performed and wrong parallax data may be produced based on a result of the wrong estimation.

It is a desire of the present invention to provide an image processing method, an image processing apparatus, a program and a recording medium wherein parallax data between a plurality of image data can be produced with a high degree of accuracy.

In order to attain the desire described above, according to an embodiment of the present invention, there is provided an image processing method including a first step of selecting a single probability density function from among a plurality of probability density functions each of which defines, for each of pixel data which form a plurality of image data, whether the pixel data belongs to a matchable region in which any pixel data corresponds to one of the pixel data in the other image data or an occlusion region in which any pixel data corresponds to none of the pixel data in the other image data, a second step of specifying a correspondence relationship in a unit of pixel data between the plural image data which minimizes the energy representative of a correspondence relationship between the plural image data defined in accordance with probability density function selected at the first step, a third step of updating parallax data indicative of a parallax between the plural image data and the occlusion regions based on the correspondence relationship defined at the second step, and a fourth step of updating the probability density functions based on the parallax data and the occlusion regions updated at the third step.

According to another embodiment of the present invention, there is provided an image processing method including a first step of producing a plurality of image data individually indicative of results of image pickup of a plurality of cameras, a second step of selecting a single probability density function from among a plurality of probability density functions each of which defines, for each of pixel data which form the image data produced at the first step, whether the pixel data belongs to a matchable region in which any pixel data corresponds to one of the pixel data in the other image data or an occlusion region in which any pixel data corresponds to none of the pixel data in the other image data, a third step of specifying a correspondence relationship in a unit of pixel data between the plural image data which minimizes the energy between the plural image data defined in accordance with probability density function selected at the second step, a fourth step of updating parallax data indicative of a parallax between the plural image data and the occlusion regions based on the correspondence relationship defined at the third step, a fifth step of updating the probability density functions based on the parallax data and the occlusion regions updated at the fourth step, and a sixth step of combining the plural image data based on the plural image data produced at the first step and the probability density functions updated at the fifth step to produce composite image data.

According to a further embodiment of the present invention, there is provided an image processing apparatus including a probability density function selection section for selecting a single probability density function from among a plurality of probability density functions each of which defines, for each of pixel data which form a plurality of image data, whether the pixel data belongs to a matchable region in which any pixel data corresponds to one of the pixel data in the other image data or an occlusion region in which any pixel data corresponds to none of the pixel data in the other image data, a correspondence relationship specification section for specifying a correspondence relationship in a unit of pixel data between the plural image data which minimizes the energy representative of a correspondence relationship between the plural image data defined in accordance with probability density function selected by the probability density function selection section, a parallax updating section for updating parallax data indicative of a parallax between the plural image data and the occlusion regions based on the correspondence relationship defined by the correspondence relationship specification section, and a probability density updating section for updating the probability density functions based on the parallax data and the occlusion regions updated by the parallax updating section.

According to a further embodiment of the present invention, there is provided a program for being executed by a computer, the program causing the computer to execute a first procedure of selecting a single probability density function from among a plurality of probability density functions each of which defines, for each of pixel data which form a plurality of image data, whether the pixel data belongs to a matchable region in which any pixel data corresponds to one of the pixel data in the other image data or an occlusion region in which any pixel data corresponds to none of the pixel data in the other image data, a second procedure of specifying a correspondence relationship in a unit of pixel data between the plural image data which minimizes the energy between the plural image data defined in accordance with probability density function selected at the first step, a third procedure of updating parallax data indicative of a parallax between the plural image data and the occlusion regions based on the correspondence relationship defined at the second step, and a fourth procedure of updating the probability density functions based on the parallax data and the occlusion regions updated at the third step.

According to a yet further embodiment of the present invention, there is provided a recording medium on which a program for being executed by a computer is recorded, the program causing the computer to execute a first procedure of selecting a single probability density function from among a plurality of probability density functions each of which defines, for each of pixel data which form a plurality of image data, whether the pixel data belongs to a matchable region in which any pixel data corresponds to one of the pixel data in the other image data or an occlusion region in which any pixel data corresponds to none of the pixel data in the other image data, a second procedure of specifying a correspondence relationship in a unit of pixel data between the plural image data which minimizes the energy between the plural image data defined in accordance with probability density function selected at the first step, a third procedure of updating parallax data indicative of a parallax between the plural image data and the occlusion regions based on the correspondence relationship defined at the second step, and a fourth procedure of updating the probability density functions based on the parallax data and the occlusion regions updated at the third step.

With the image processing methods and apparatus, program and recording medium, parallax data between a plurality of image data can be produced with a high degree of accuracy.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a flow chart illustrating an example of operation of the image processing apparatus shown in FIG. 1;

FIGS. 7, 8A, 8B and 9 are views illustrating effects of the image processing apparatus shown in FIG. 1;

FIGS. 11A and 11B are diagrammatic views illustrating a process at step ST21 illustrated in FIG. 10;

FIG. 12 is a diagrammatic view illustrating a process at step ST22 illustrated in FIG. 10.

DETAILED DESCRIPTION OF THE PREFERRED EMBODIMENTS

In the following, image processing apparatus to which the present invention is applied are described with reference to the accompanying drawings.

First Embodiment

Steps ST2 and ST11 illustrated in FIG. 5 are an example of a first step of the first embodiment and a second step of the second embodiment of the present invention.

Steps ST6 and ST7 illustrated in FIG. 5 are an example of a second step of the first embodiment and a third step of the second embodiment of the present invention.

A step ST8 illustrated in FIG. 5 is an example of a third step of the first embodiment and a fourth step of the second embodiment of the present invention.

A step ST10 illustrated in FIG. 5 is an example of a fourth step of the first embodiment and a fifth step of the second embodiment of the present invention.

Energy E(f) is an example of the energy in the present invention.

A probability density function PD is an example of the probability density function in the present invention.

Parallax data DM is an example of the parallax data in the present invention.

Execution of the steps ST2 and ST11 illustrated in FIG. 5 by an image processing circuit 12 implements an example of the probability density function selection section of the third embodiment of the present invention.

Execution of the steps ST6 and ST7 illustrated in FIG. 5 by the image processing circuit 12 implements an example of the correspondence relationship specification section of the third embodiment of the present invention.

Execution of the step ST8 illustrated in FIG. 5 by the image processing circuit 12 implements an example of the parallax updating section of the third embodiment of the present invention.

Execution of the step ST10 illustrated in FIG. 5 by the image processing circuit 12 implements an example of the probability density function updating section of the third embodiment of the present invention.

Further, a program PRG illustrated in FIG. 12 is an example of the program of the present invention.

Figure 1:
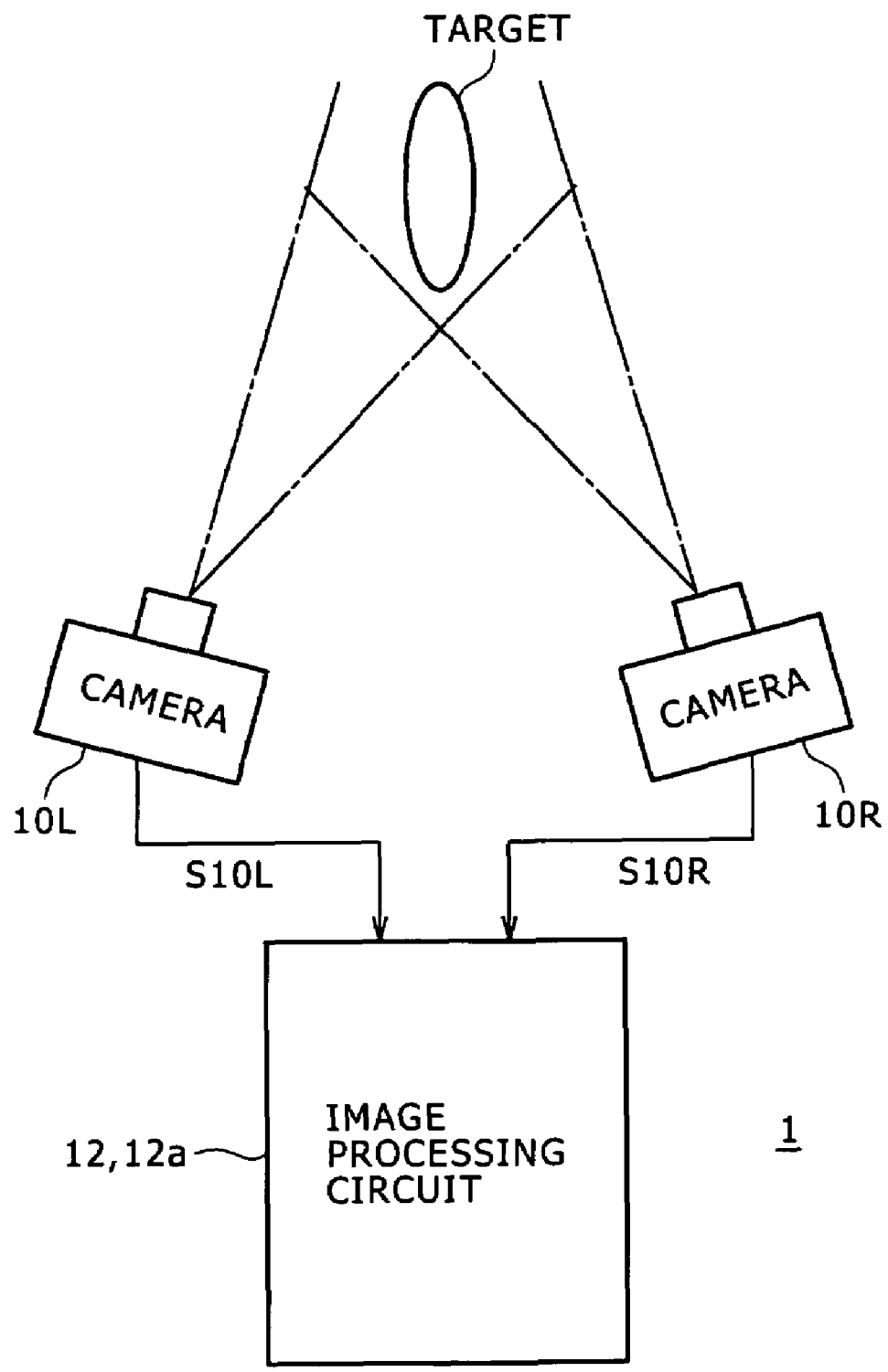
FIG. 1 is a schematic view showing a general configuration of an image processing apparatus to which the present invention is applied.

FIG. 1 shows a configuration of an image processing apparatus 1 to which the present invention is applied.

Referring to FIG. 1, the image processing apparatus 1 includes, for example, a pair of cameras 10R and 10L, and an image processing circuit 12.

The camera 10R picks up an image of a subject TARGET and outputs resulting picked up image data S10R to the image processing circuit 12.

The camera 10L is disposed in a spaced relationship by a predetermined distance from the camera 10R.

The camera 10L picks up an image of the subject TARGET similarly to the camera 10R and outputs resulting picked up image data S10L to the image processing circuit 12.

In the following, the image processing circuit 12 is described in detail.

The image processing circuit 12 produces parallax data DM between the picked up image data S10R and S10L inputted from the cameras 10R and 10L, respectively.

In particular, the image processing circuit 12 successively selects a plurality of probability density functions PD each of which defines, for each of pixel data which form the picked up image data S10R and S10L, whether the pixel data belongs to a matchable region in which any pixel data corresponds to one of the pixel data in the other picked up image data or an occlusion region in which any pixel data corresponds to none of the pixel data in the other picked up image data.

A probability density function is an actual value function which provides, when it is integrated on an arbitrary set, a probability in which a random variable is included in the set.

Then, the image processing circuit 12 specifies a correspondence relationship f in a unit of a pixel data between the picked up image data S10R and S10L which minimizes the energy E(f) between the picked up image data S10R and S10L defined in accordance with the selected probability density function PD.

Then, the image processing circuit 12 updates parallax data DM indicative of the parallax between the picked up image data S10R and S10L based on the specified correspondence relationship f.

The image processing circuit 12 specifies that one of the plural probability density functions PD which minimizes the energy E(f) and the parallax data DM updated corresponding to the probability density function PD.

Then, the image processing circuit 12 produces pseudo picked up image data at a designated position other than the eye point of the cameras 10R and 10L based on the parallax data DM specified as above.

In the present embodiment, reference character R denotes the picked up image data S10R (right image), and L the picked up image data S10L (left image).

Further, reference characters IL( ) and IR( ) denote functions which return a luminance of a pixel in the left and right images, respectively.

Reference characters RML and RMR denote matched regions of the left and right images, respectively, and ROL and ROR denote occlusion regions of the left and right images, respectively.

Figure 2:
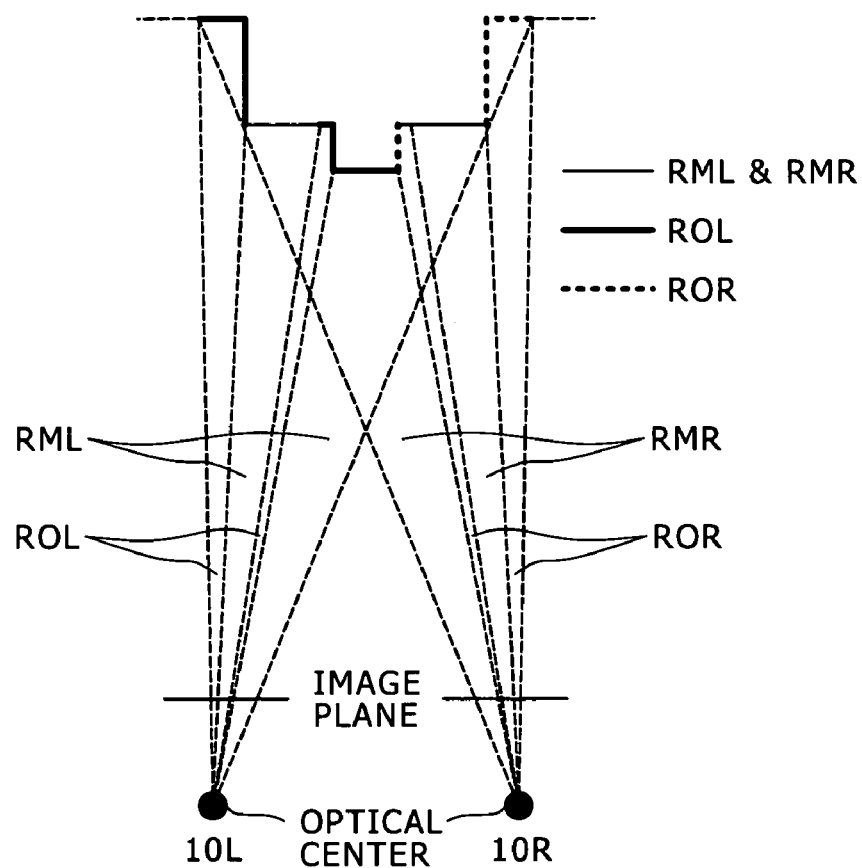
FIG. 2 is a diagrammatic view illustrating matched regions and occlusion regions of left and right images.

Further, a relationship between a stereo vision and RML, RMR and ROL, ROR is illustrated in FIG. 2.

The image processing circuit 12 calculates the energy E(f) in accordance with the following expression (1):

$$E(f) = E_{data}(f) + E_{occl}(f) + E_{smooth}(f) \quad (1)$$

where f represents a region distinction and correspondence relationship of pixel data between the picked up image data S10R and S10L.

Further, the energy E(f) represents the sum total of the costs of differences of pixel values between pixel data pairs in the matchable regions and is defined by the following expression (2):

$$E_{data}(f) = \sum_{m_f} DCM(i_1, i_2), m_f \quad (2)$$

where $m_f$ is a matched pair between the left and right images in f, and DCM[ ] is a match cost function calculated in accordance with a preceding (calculated in the preceding cycle) correspondence relationship (configuration) f.

Meanwhile, the energy Eoccl(f) represents the sum total of penalties for the fact that pixels are occluded and is defined by the following expression (3):

$$E_{occl}(f) = \sum_{ol_f} OPL(IL(ol_f)) + \sum_{or_f} OPR(IR(or_f)) \quad (3)$$

where olf and orf are the left and right occlusion pixels, respectively, and OPL( ) and OPR( ) are penalty functions of the left and right occlusions calculated in accordance with the preceding correspondence relationship f.

Further, the energy Esmooth(f) represents the smoothness cost for making adjacent pixels in the same image have a similar parallax value in the current correspondence relationship f and is defined by the following expression (4):

$$E_{smooth}(f) = \sum_{\{m'_f, m''_f\} \in N} V_{m'_f m''_f} \cdot T[f(m'_f) \neq f(m''_f)] \quad (4)$$

where N is the relationship for decision of whether or not two pairs $m'_f$ and $m''_f$ are adjacent each other, and $Vm'_f$ and $Vm''_f$ are the smoothness penalty functions of the pairs. Further, f(m) returns a parallax of the pair $m_f$, and T[ ] returns 1 where the condition in [ ] is true, but returns 0 in any other case.

In the present embodiment, the energy DMC($i_1, i_2$) of the expression (2) given hereinabove is defined by the following expression (5):

$$DCM(i_1, i_2) = -\frac{1}{|M_{f'}|} \log[P_{ML,MR,f0}(i_1, i_2|S)] \otimes g_{\psi,2}(i_1, i_2) \quad (5)$$

where $|M_{f0}|$ is the number of matched pairs calculated in accordance with the correspondence relationship f, and S is the condition of the stereo vision. Further, $P_{ML,MR,f0(i1,i2|S)}$ represents the simultaneous probability distribution of ML and MR calculated in accordance with the preceding correspondence relationship f0. Further, $g_{\psi,2}(i_1,i_2)$ represents a two-dimensional core function of the Parzen estimation (non-parametric probability density function estimation) and may be, for example, a Gaussian distribution. The encircled mark x represents the convolution.

Further, the energy Eoccl(f) of the expression (3) given hereinabove is defined by the following expressions (6):

$$OPL(i) = -\frac{1}{|O_{f0}|} \log[P_{OL,f0}(i|S)] \otimes g_{\psi,1}(i) \qquad (6)$$

$$OPR(i) = -\frac{1}{|O_{f0}|} \log[P_{OR,f0}(i|S)] \otimes g_{\psi,1}(i)$$

where $|O_{f0}|$ is the number of occlusions calculated in accordance with the preceding correspondence relationship f0. The number of occlusions is equal between the left and right images because of the uniqueness constraint. Further, $P_{OL,f0}(i|S)$ and $P_{OR,f0}(i|S)$ represent the probability distributions of OL and OR calculated in accordance with the preceding correspondence relationship f in the condition S of the stereo vision, respectively. Further, $g_{\psi,1}(i)$ represents a one-dimensional core function of the Parzen estimation and may be, for example, a Gaussian distribution.

Here, actual pixel values are discrete values, and the expressions (5) and (6) given hereinabove can be transformed into the sum totals of values which any pixel value can assume. In the present embodiment, the number of values which the pixel value can assume is 256.

In a discrete system, the sum total of core functions for different evaluations can be described as a convolution between the core functions and the sum total of single impulses.

Consequently, the following expressions (7) and (8) can be defined corresponding to the expressions (5) and (6), respectively:

$$P_{ML,MR,f}(i_1, i_2|S) = \frac{1}{|M_f|} \sum_{m_f} g_{\psi,2}[(i_1, i_2) - (IL(m_f), IR(m_f))] \qquad (7)$$

$$P_{OL,f}(i|S) = \frac{1}{|O_f|} \sum_{ol_j} g_{\psi,1}[i - IL(ol_f)] \qquad (8)$$

$$P_{OR,f}(i|S) = \frac{1}{|O_f|} \sum_{or_j} g_{\psi,1}[i - IR(or_f)]$$

The expression (7) defines the correspondence relationship f and is used to calculate $P_{ML,MR,f}(i_1, i_2|S)$, and if f is f0, then $P_{ML,MR,f0}(i_1,i_2|S)$ can be calculated. Further, $g_{\psi,2}(i_1,i_2)$ is a two-dimensional core function of the Parzen estimation and may be, for example, a two-dimensional Gaussian distribution.

On the other hand, the expressions (8) define the correspondence relationship f and is used to calculate $P_{OL,f}(i|S)$ and $P_{OR,f}(i|S)$, and if f is f0, then $P_{OL,f0}(i|S)$ and $P_{OR,f0}(i|S)$ can be calculated.

The image processing circuit 12 calculates the energy Edata(f) and the energy Esmooth(f) in accordance with the expressions (5) to (8) given hereinabove.

In the following, the reason why the expressions (5) and (6) are used in the present embodiment is described.

In the present embodiment, the variables ML and MR are for production of pixel values (intensities) of image data in the matchable regions between the picked up image data S10R and S10L, respectively.

Meanwhile, the variables OL and OR are for production of pixel values of pixel data in the occlusion regions of the picked up image data S10L and S10R, respectively.

In the present embodiment, a premise is used that the probability density functions PD of the cameras S10R and S10L (stereo images) are independent between the pixel data in the matchable regions and the pixel data in the occlusion regions and besides are independent also between the pixel data in the occlusion region of the picked up image data S10R and the pixel data in the occlusion region of the camera S10L as given by the following expressions (9) and (10):

$$P_{ML,OL,MR,OR,f}(i_1,i_2,i_3,i_4|S)$$

$$=P_{ML,MR,f}(i_1,i_2|S) \cdot P_{OL,OR,f}(i_3,i_4|S) \qquad (9)$$

$$P_{OL,OR,f}(i_3,i_4|S) = P_{OL,f}(i_3|S) \cdot P_{OR,f}(i_4|S) \qquad (10)$$

In the expression (9) above, the left side represents the simultaneous probability distribution of ML, OL, MR, and OR calculated in accordance with f in the condition S of the stereo vision. $P_{ML,MR,f}(i_1,i_2|S)$ on the right side indicates the simultaneous probability distribution of ML and MR. Further, $P_{OL,OR,f}(i_3,i_4|S)$ indicates the simultaneous probability distribution of OL and OR.

Further, in the expression (10) above, $P_{OL,f}(i_3|S)$ and $P_{OR,f}(i_4|S)$ represent the probability distributions of OL and OR calculated in accordance with f in the condition S of the stereo vision, respectively.

Incidentally, the MI (Mutual Information) is defined by the following expression (11):

$$CMI_f(ML,OL;MR,OR|S)$$

$$=H_f(ML,OL|S)+H_f(MR,OR|S)$$

$$-H_f(ML,OL,MR,OR|S) \qquad (11)$$

where the left side represents the mutual information amount of ML, OL and MR, OR calculated in accordance with f in the condition S of the stereo vision. Further, $H_f(ML,OL|S)$ represents the entropy of ML and OR calculated in accordance with f in the condition S of the stereo vision, and $H_f(MR,OR|S)$ represents the entropy of MR and OR calculated in accordance with f in the condition S of the stereo vision. $H_f(ML,OL,MR,OR|S)$ represents the entropy of MR, ML, OL, and OR calculated in accordance with f in the condition S of the stereo vision.

It is a desire here to determine the parallax data DM and the probability density function PD which maximize the MI.

In the expression (11) above, since the entropies $H_f(ML,OL|S)$ and $H_f(MR,OR|S)$ are fixed in stereo matching, the maximization of the MI is equivalent to minimization of the entropy $H_f(ML,OL,MR,OR|S)$.

Here, $H_f(ML,OL,MR,OR|S)$ is defined by the following expression (12):

$$H_f(ML,OL,MR,OR|S)$$

$$=-\int\int\int\int \log [P_{ML,OL,MR,OR,f}(i_1,i_2,i_3,i_4|S)]P_{ML,OL,MR,OR,f}(i_1,i_2,i_3,i_4|S)di_1 di_2 di_3 di_4 \qquad (12)$$

From the premise described hereinabove, $H_f(ML,OL,MR,OR|S)$ in the expression (12) above can be further transformed as given by the following expression (13):

$$H_f(ML, OL, MR, OR|S) = \qquad (13)$$
$$-\int\int P_{ML,MR,f}(i_1, i_2|S)\log P_{ML,MR,f}(i_1, i_2|S)di_1 di_2 -$$
$$\int P_{OL,f}(i|S)\log P_{OL,f}(i|S)di - \int P_{OR,f}(i|S)\log P_{OR,f}(i|S)di =$$
$$H_f(ML, MR|S) + H_f(OL|S) + H_f(OR|S)$$

where $H_f(ML,MR|S)$ is the entropy of ML and MR calculated in accordance with f in the condition S of the stereo vision, and $H_f(OL|S)$ is the entropy of OL calculated in accordance with f in the condition S of the stereo vision while $H_f(OR|S)$ is the entropy of OR calculated in accordance with f in the condition S of the stereo vision.

The image processing circuit 12 minimizes $H_f(ML,OL,MR,OR|S)$ indicated by the expression (13) above by the Graph Cut method.

The energy function can be optimized by the Graph Cut method. Here, the MI to be optimized is an integration of the probability density functions PD to be evaluated.

In the present embodiment, the technique of Non-Patent Document disclosed by Non-Patent Document 4 given hereinabove is applied to specify the parallax data DM and the probability density function PD which minimize $H_f(ML,OL,MR,OR|S)$ by the Graph Cut method.

Incidentally, $F(x)=x\log x$ is Taylor expanded as given by the following expression (14):

$$F(x) = -x_0 + (1 + \log x_0)x + o((x-x_0)^2) \quad (14)$$

By applying the Taylor expansion of the expression (14) above to each term of the expression (13) above, the following expressions (15) and (16) are obtained:

$$H_f(ML,MR|S)$$
$$= \int\int P_{ML,MR,f0}(i_1,i_2|S)di_1 di_2 - \int\int P_{ML,MR,f}(i_1,i_2|S)di_1 di_2$$
$$- \int\int P_{ML,MR,f}(i_1,i_2|S)\log(P_{ML,MR,f0}(i_1,i_2|S))di_1 di_2 \quad (15)$$

$$H_f(OL|S) = \int P_{OL,f0}(i|S)di - \int P_{OL,f}(i|S)di - \int P_{OL,f}(i|S)\log(P_{OL,f0}(i|S))di$$

$$H_f(OR|S) = \int P_{OR,f0}(i|S)di - \int P_{OR,f}(i|S)di - \int P_{OR,f}(i|S)\log(P_{OR,f0}(i|S))di \quad (16)$$

where f0 is the preceding correspondence relationship of the previous iteration, and f is the correspondence relationship after the optimization process.

In the present embodiment, it is premised that, even if the correspondence relationship changes from f0 to f, the evaluation of the probability density functions PD does not change much.

Therefore, since the following expressions (17) to (20) are 1 and hence fixed, they are removed from the expressions (15) and (16):

$$\int\int P_{ML,MR,f0}(i_1,i_2|S)di_1 di_2 \quad (17)$$

to $$\int\int P_{ML,MR,f}(i_1,i_2|S)di_1 di_2 \quad (18)$$

$$\int P_{OL,f0}(i|S)di$$

$$\int P_{OR,f0}(i|S)di \quad (19)$$

$$\int P_{OL,f}(i|S)di$$

$$\int P_{OR,f}(i|S)di \quad (20)$$

Figure 3:
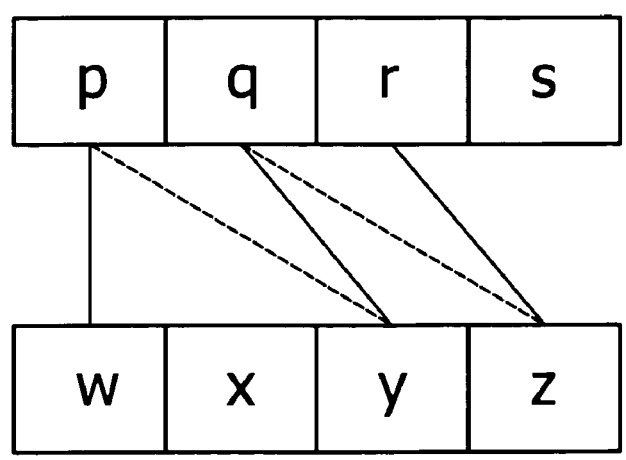
FIG. 3 is a diagrammatic view illustrating an example of a correspondence relationship in a unit of pixel data between a right image and a left image.
Figure 4:
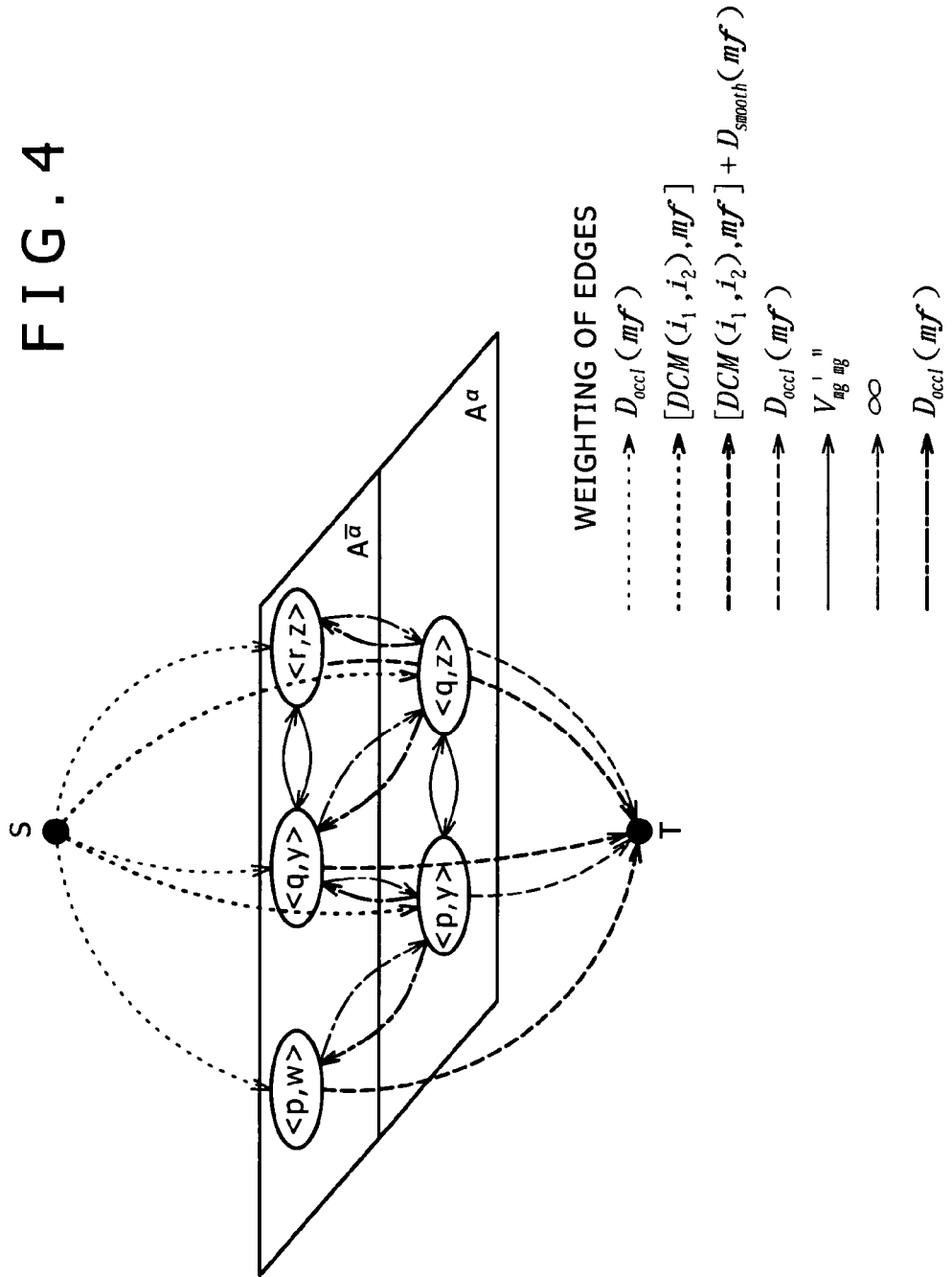
FIG. 4 is a diagrammatic view illustrating a concept of the energy defined by the image processing apparatus shown in FIG. 1.

Consequently, the expressions (15) and (16) can be transformed into the following expressions (21) and (22), respectively:

$$H_f(ML,MR|S) = \sum_{m_f} -\frac{1}{|M_{f'}|} \quad (21)$$
$$\int\int \log[P_{ML,MR,f0}(i_1,i_2|S)] \cdot g_{\psi,2}[(i_1,i_2)-(IL(m_f),IR(m_f))] di_1 di_2$$

$$H_f(OL|S) = \sum_{ol_f} -\frac{1}{|O_{f'}|} \int \log[P_{OL,f0}(i|S)] \cdot g_{\psi,1}[i - IL(ol_f)]di \quad (22)$$

$$H_f(OR|S) = \sum_{or_f} -\frac{1}{|O_{f'}|} \int \log[P_{OR,f0}(i|S)] \cdot g_{\psi,1}[i - IR(or_f)]di$$

where "$1/|M|$" and "$1/|O_k|$" are shaping coefficients for estimation. Where the expression (1) given hereinabove is considered, the expression (5) given hereinabove can be introduced from the expression (21) given hereinabove, and the expression (6) given hereinabove can be introduced from the expression (22) given hereinabove.

Where such a correspondence relationship as illustrated in FIG. 3 exists between pixel data (p, q, r, s) of the picked up image data S10R and pixel data (w, x, y, z) of the picked up image data S10L, the image processing circuit 12 constructs, for example, a graph illustrated in FIG. 4.

In FIG. 3, a broken line indicates a (correspondence relationship under present conditions) and a continuous line indicates a (correspondence relationship which allows α-Expansion).

In FIG. 4, Doccl($m_f$) and Dsmooth($m_f$) represent the energies Eoccl($m_f$) and Esmooth($m_f$) relating to a matched pair $m_f$, respectively.

In the following, a process of the image processing apparatus 1 shown in FIG. 1 for producing, based on the picked up image data S10R and S10L inputted from the cameras 10R and 10L, parallax data DM between the picked up image data S10R and S10L is described.

FIG. 5 is a flow chart illustrating the process of the image processing circuit 12 shown in FIG. 1.

Step ST1:
The image processing circuit 12 initializes the parallax data DM and the occlusion regions.

Step ST2:
The image processing circuit 12 initializes the probability density functions PD.

Step ST3:
The image processing circuit 12 sets the energy E(f) to the infinite.

Step ST4:
The image processing circuit 12 calculates the energies Edata(f) and Eoccl(f) in accordance with the expressions (5) to (8) given hereinabove.

Here, the energies Edata(f) and Eoccl(f) depend upon the parallax data DM and the probability density functions PD. The image processing circuit 12 uses DMC($i_1,i_2,S$) of the expression (5) as the energy Edata(f) and uses OPL(i) and OPR(i) of the expressions (6) as the energies Eoccl(f).

More particularly, the image processing circuit 12 produces histogram data MHIS of pixels within the matchable regions, histogram data LOHIS of pixels in the left occlusion regions and histogram data ROHIS of pixels of the right occlusion regions based on the probability density functions PD, the picked up image data S10L of the camera 10L and the picked up image data S10R of the camera 10R.

The image processing circuit 12 convolutes the core function into the three histogram data MHIS, LOHIS and ROHIS.

Then, the image processing circuit 12 maps results of the convolution with a function $F(x)=-\log(x)$.

The image processing circuit 12 convolutes the core function again into the results of the mapping.

Consequently, the image processing circuit 12 obtains a 256×256 2D data cost matrix with regard to the pixels in the matchable regions and determines the 2D data cost matrix as the energy Edata(f).

Further, from the pixels of the left and right occlusion regions, a 256 1D occlusion penalty matrix is obtained and determined as energy Eoccl(f).

Therefore, the image processing circuit 12 can achieve a matching process, which is performed later, at a high speed by a table search method in which the matrices are used.

The image processing circuit 12 performs updating of the probability density functions PD every time all α-occlusions are completed.

Step ST5:

The image processing circuit 12 calculates the energy Esmooth(f).

The image processing circuit 12 calculates a smoothness cost of two pixel pairs adjacent each other in accordance with the following expression (23) to determine an automatic parameter:

$$V_{m'_f,m''_f} = \begin{cases} 3\lambda & \max(|IL(m'_f) - IL(m''_f)|, \ |IR(m'_f) - IR(m''_f)|) < 8 \\ \lambda & \text{else} \end{cases} \quad (23)$$

In equation (23), the numbers 3 and 8 are values indicative of properties correlating to the existence of an edge between two pixel pairs. These particular numbers are not exclusive, and other numbers may be selected.

The image processing circuit 12 performs automatic parameter detection and λ detection based on the picked up image data S10L of the camera 10L and the picked up image data S10R of the camera 10R.

Such information exists in the data costs of the pixels in the matchable region.

Accordingly, the image processing circuit 12 executes sorting for all 256×256 possible data costs.

Then, the image processing circuit 12 selects one of the costs disposed in a predetermined order in accordance with a result of the sorting.

Then, the image processing circuit 12 multiplies the cost value by a coefficient lower than 1 to calculate λ.

Thereafter, the image processing circuit 12 calculates the energy Esmooth(f) based on $V_{m1,m2}$ of the expression (23) given hereinabove and the expression (4) given hereinabove.

Step ST6:

The image processing circuit 12 selects a correspondence relationship f which is not processed as yet from among a plurality of parallax values.

The image processing circuit 12 calculates, for the selected correspondence relationship f, the energy E(f) in accordance with the expression (1) based on the energies Edata(f), Eoccl (f) and Esmooth(f) produced at steps ST4 and ST5.

The selection of the correspondence relationship f here is equivalent to the selection of a parallax.

In the selection of the correspondence relationship f, the image processing circuit 12 selects with reference to D+1 labels including a number of labels corresponding to a maximum parallax determined in advance and a label for occlusion.

Step ST7:

The image processing circuit 12 decides whether or not the energy E(f) calculated in the present cycle at step ST6 is lower than the minimum energy E(f) calculated till then. If the image processing circuit 12 decides that the calculated energy E(f) is lower than the minimum energy E(f), then the processing advances to step ST8, but in the other case, the processing advances to step ST9.

Step ST8:

The image processing circuit 12 updates the parallax data DM and the occlusion regions in response to the correspondence relationship f selected last at step ST6.

Step ST9:

The image processing circuit 12 decides whether or not the processes at steps ST6 to ST8 are executed for all of the correspondence relationships f defined in advance with regard to the probability density function PD of the processing object. If the image processing circuit 12 decides that the processes are executed, then the processing advances to step ST10, but in the other case, the processing returns to step ST6.

Step ST10:

The image processing circuit 12 decides whether or not the process in which all of those probability density functions PD which may possibly reduce the energy E(f) are used is ended or the process is ended by a predetermined number of times. If it is decided that the process is ended, then the processing is ended, but in the other case, the processing advances to step ST11.

Step ST11:

The image processing circuit 12 selects (updates) one of those of a plurality of probability density functions PD prescribed in advance which are not processed as yet as a processing object.

The image processing circuit 12 specifies a probability density function PD, parallax data DM and an occlusion region selected at a stage at which the process is ended at step ST10 after the processes described above are executed.

According to the image processing apparatus 1, since a probability density function PD which minimizes the energy E(f) defined by the expression (5) is selected (searched out) as described hereinabove, the correspondence relationship in a unit of a pixel between the picked up image data S10L and S10R with a higher degree of accuracy than in conventional techniques wherein it is premised that two images have an equal luminance or it is estimated by a matching process to which one of a matchable region and an occlusion region a pixel belongs.

Consequently, according to the image processing apparatus 1, the parallax data DM with a high degree of accuracy is produced, and the composite image (the image viewed from the intermediate position between camera 10L and 10R) which is composite the picked up image data S10L with S10R is produced.

Furthermore, according to the image processing apparatus 1, the premise that the probability density functions PD of the picked up image data S10R and S10L (stereo images) are independent between the pixel data in the matchable regions and the pixel data in the occlusion regions and are independent also between the pixel data in the occlusion region of the picked up image data S10R and the image data in the occlusion region of the picked up image data S10L as represented by the expressions (9) and (10).

Consequently, according to the image processing apparatus 1, probability density functions PD and parallax data DM can be produced with a high degree of accuracy so that the MI represented by the expression (11) is maximized.

Figure 6:
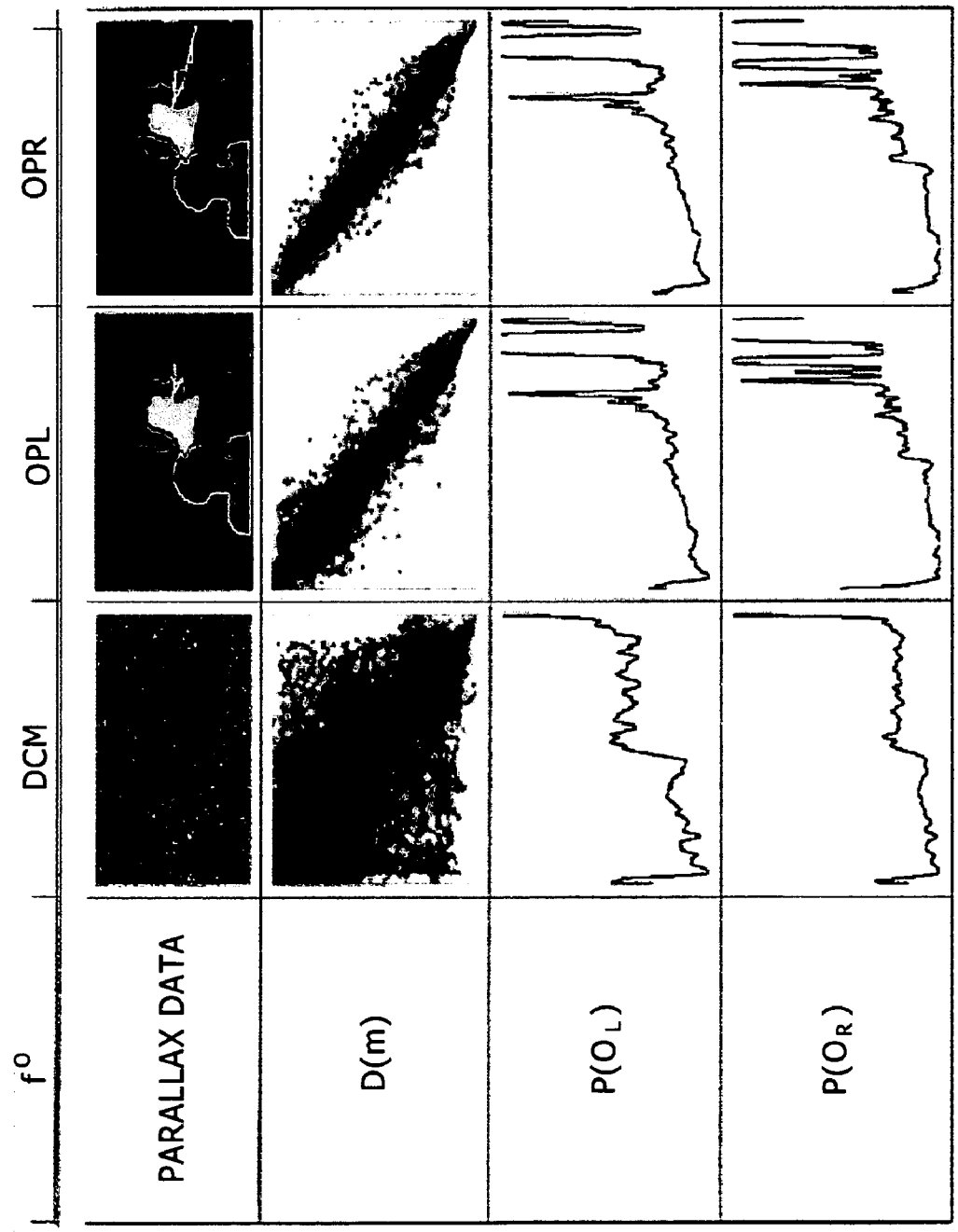
FIG. 6 is a view illustrating data used in a process of the image processing apparatus shown in FIG. 1.

The production of DMC, OPL(i) and OPR(i) at step ST4 illustrated in FIG. 5 and the updating of parallax data DM at step ST8 are performed in such a manner as seen in FIG. 6.

Figure 7:
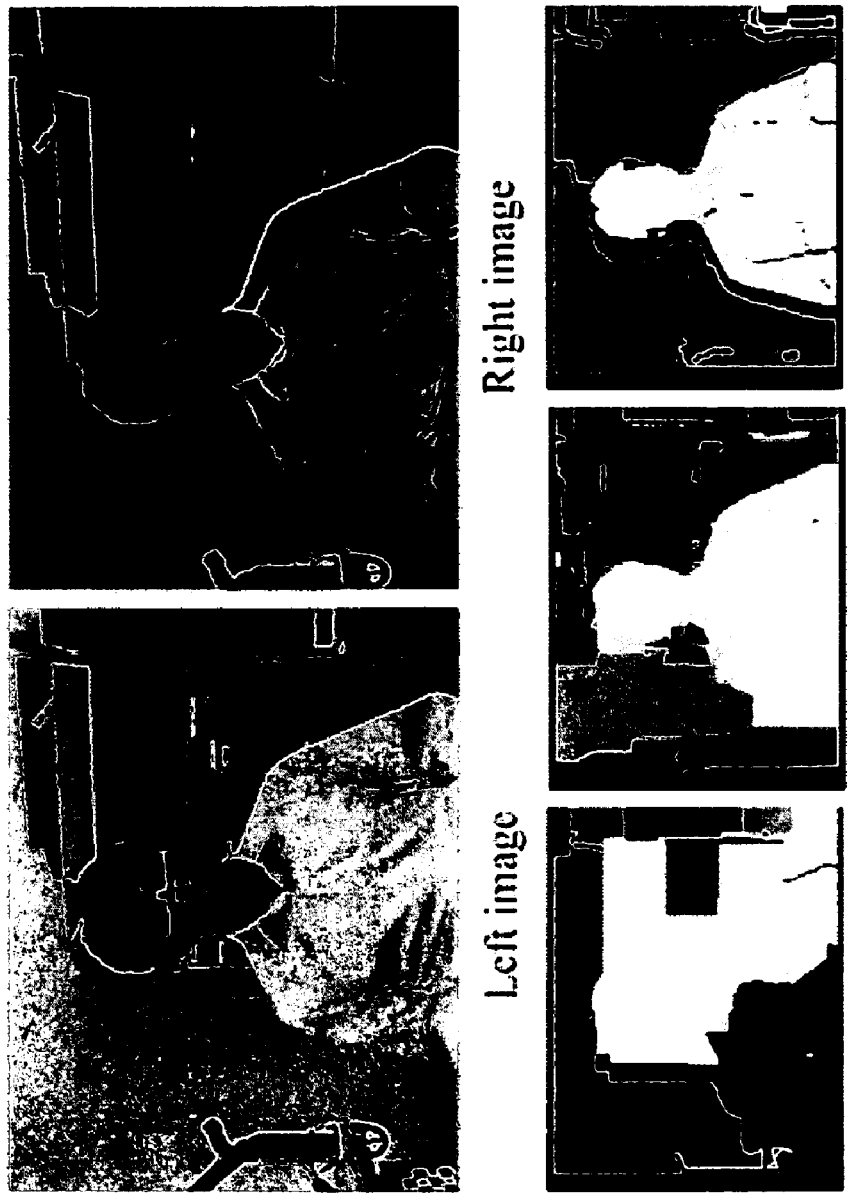

The parallax data DM obtained by the image processing apparatus 1 is, for example, such as illustrated at a right lower portion (Disparity of ours) of FIG. 7 and has a higher degree of quality than that of conventional parallax data (Disparity of [2]) and (Disparity of [4]) on the left side of the right lower portion.

In the following, evaluation of the technique by the image processing apparatus 1 of the present embodiment is described.

With regard to a standard test for stereo matching, the technique of the image processing apparatus 1 has such features as illustrated in FIG. 8A when compared with those of the technique of Non-Patent Document 4 (technique which does not take the occlusion into consideration).

Further, the technique of the image processing apparatus 1 has such features as illustrated in FIG. 8B when compared with those of the technique of Non-Patent Document 2 (technique which does not use the MI). In FIG. 8B, the technique of Non-Patent Document 2 uses R, G and B information, the technique of the image processing apparatus 1 uses only luminance information. Nevertheless, the technique of the image processing apparatus 1 is approximate to the technique of Non-Patent Document 2. With regard to grey map data, the technique of the image processing apparatus 1 is superior to the technique of Non-Patent Document 2.

The evaluation of robustness is performed selecting "Tsukuba" as a comparative example. Conversions and error rates when the picked up image data S10R is converted while the picked up image data S10L is fixed are illustrated in FIG. 9.

The resize conversion simulates a low resolution camera. First, an image is converted into an image of a ¼ size and then converted back into an image of the original size. In the additional conversion of Gaussian noise and resizing, where the MI is not used, a better result is obtained than where the MI is used.

This is because, according to the technique of the image processing apparatus 1 (technique which uses the MI), robustness is obtained by the fixedness of the MI in one-by-one mapping. Also this is because the technique which does not use the MI in the present cycle adopts RGB information. In other words, the color information has a role of reducing the noise effect.

Second Embodiment

An image processing circuit 12a according to a second embodiment of the present invention is shown in FIG. 1 and is similar to the image processing circuit 12 of the first embodiment except in a process described below of the image processing circuit 12a.

In the present embodiment, a technique for calculating the energy Edata(f) at step ST4 illustrated in FIG. 5 is different from that described in connection with the first embodiment.

Figure 10:
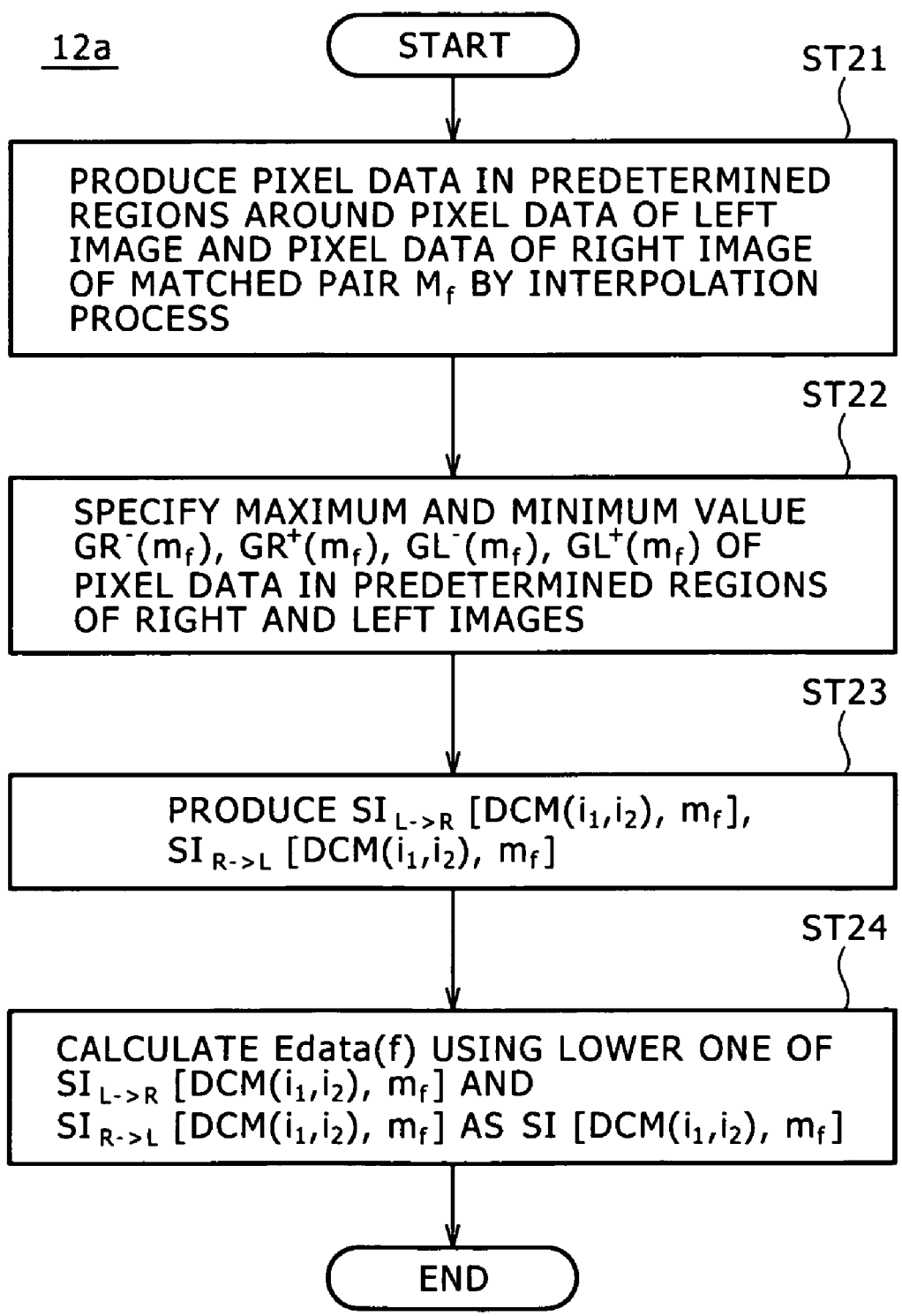
FIG. 10 is a flow chart illustrating a process by another image processing apparatus to which the present invention is applied.

FIG. 10 is a flow chart illustrating the technique for calculating the energy Edata(f) at step ST4 illustrated in FIG. 5.

Step ST21:

The image processing circuit 12a produces image data in a predetermined range AR around pixel data of the picked up image data S10R (right image) in each of matched pairs $m_f$ as shown in FIG. 11A by an interpolation process. In other words, the image processing circuit 12a produces pixel data of a small-number pixel accuracy. The interpolation process may be linear interpolation, spline or the like. The predetermined range AR is a quadrangular range defined by [x−½, x+½] and [y−½, y+½] where the point corresponding to $m_f$ is (x, y).

Further, the image processing circuit 12a produces pixel data within a predetermined range AL around pixel data of the picked up image data S10L (left image) in the matched pair $m_f$ as seen from FIG. 11B by an interpolation process. The predetermined range AL has a size, for example, equal to that of the predetermined range AR.

Step ST22:

The image processing circuit 12a specifies a minimum value $GR^-(m_f)$ and a maximum value $GR^+(m_f)$ of the pixel data within the predetermined range AR of the picked up image data S10R produced at step ST21 as seen in FIG. 12.

The image processing circuit 12a specifies a minimum value $GL^-(m_f)$ and a maximum value $GL^+(m_f)$ of the pixel data within the predetermined range AL of the picked up image data S10L produced at step ST21.

Step ST23:

The image processing circuit 12a produces $SI_{L \to R}[DCM(i_1,i_2),m_f]$ in accordance with the following expression (24):

$$SI_{L \to R}[DCM(i_1, i_2), m_f] = \min_{GR^-(m_f) \le i \le GR^+(m_f)} DCM(IL(m_f), i) \quad (24)$$

In particular, the image processing circuit 12a calculates DCM (defined by the expression (5) given hereinabove) values between the pixel data $IL(m_f)$ of the picked up image data S10L illustrated in FIG. 11A and the pixel data between the minimum value $GR^-(m_f)$ to the maximum value $GR^+(m_f)$ in the predetermined range AR of the picked up image data S10R and then determines a minimum one of the DCM values as $SI_{L \to R}[DCM(i_1, i_2),m_f]$.

Then, the image processing circuit 12a produces $SI_{R \to L}[DCM(i_1,i_2),m_f]$ in accordance with the following expression (25):

$$SI_{R \to L}[DCM(i_1, i_2), m_f] = \min_{GL^-(m_f) \le i \le GL^+(m_f)} DCM[i, IR(m_f)] \quad (25)$$

In particular, the image processing circuit 12a calculates DCM (defined by the expression (5) given hereinabove) values between the pixel data $IR(m_f)$ of the picked up image data S10R illustrated in FIG. 11B and the pixel data between the minimum value $GL^-(m_f)$ and the maximum value $GL^+(m_f)$ in the predetermined range AL of the picked up image data S10L and then determines a minimum one of the DCM values as $SI_{R \to L}[DCM(i_1,i_2),m_f]$.

It is to be noted that, in the present embodiment, there is no limitation to the particular form of the cost function, and the cost of a table search like the MI (Mutual Information) may be used as the DCM.

Step ST24:

The image processing circuit 12a selects a lower one of $SI_{L \to R}[DCM(i_1,i_2),m_f]$ and $SI_{R \to L}[DCM(i_1,i_2),m_f]$ produced at step ST23 as given by the following expression (26) and sets the selected value to $SI[DCM(i_1,i_2),m_f]$:

$$SI[DCM(i_1,i_2),m_f]=\min\{SI_{L \to R}[DCM(i_1,i_2),m_f],SI_{R \to L}[DCM(i_1,i_2),m_f]\} \quad (26)$$

Then, the image processing circuit 12a accumulates $SI[DCM(i_1,i_2),m_f]$ defined by the expression (26) above for all matched pairs $m_f$ defined by the correspondence relationship f as given by the following expression (27) to calculate the energy Edata(f):

$$E_{data}(f) = \sum_{m_f} SI[DCM(i_1, i_2), m_f] \qquad (27)$$

According to the present embodiment, the restriction that only a cost function of a monotonic closed form can be handled as in the case of the conventional SI (Sampling Insensitive) measure can be eliminated to diversify the cost function to be used.

It is to be noted that, in the present embodiment, the process illustrated in FIG. 10 may be implemented by execution of a program by a computer or may be executed using hardware for exclusive use which performs the processes at the steps.

The present invention is not limited to the embodiments described hereinabove.

In particular, one skilled in the art may apply various alteration, combination, sub combination and exchange of the components of the embodiments described hereinabove within the technical scope of the present invention or within the scope of the equivalence.

For example, the image processing circuit 12 may be implemented as hardware for exclusive use which executes all or part of the steps illustrated in FIG. 5 or 10.

Figure 13:
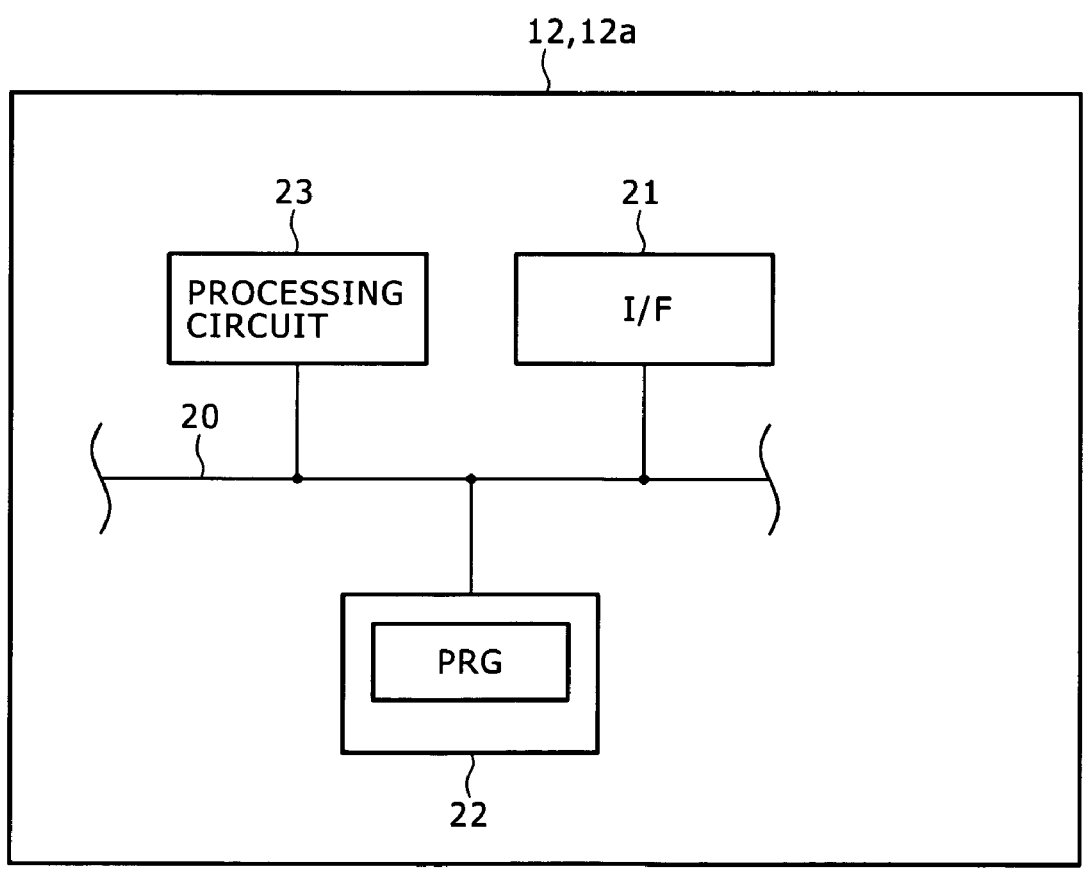
FIG. 13 is a block diagram showing a modification to the image processing apparatus shown in FIG. 1.

Further, the image processing circuit 12 may be configured otherwise such that, for example, as shown in FIG. 13, an interface 21, a memory 22 and a processing circuit 23 are connected to each other through a bus 20.

In this instance, the processing circuit 23 reads out a program PRG from the memory 22 and executes the process at each step illustrated in FIG. 5 or 10.

At this time, the processing circuit 23 stores intermediate data obtained by the processes at the steps illustrated in FIG. 5 or 10 suitably into the memory 22 or some other buffer memory and reads out and uses the intermediate data as occasion demands.

It is to be noted that the memory 22 may be a recording medium such as a semiconductor memory, an optical disk, a magnetic disk or a magneto-optical disk.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing method performed by an image processing circuit, comprising:
    a first step of selecting a single probability density function from among a plurality of probability density functions each of which defines, for each of pixel data which form a plurality of image data, whether the pixel data belongs to a matchable region in which any pixel data corresponds to one of said pixel data in the other image data or an occlusion region in which any pixel data corresponds to none of said pixel data in the other image data;
    a second step of specifying a correspondence relationship in a unit of pixel data between said plural image data which minimizes the energy representative of a correspondence relationship between said plural image data defined in accordance with probability density function selected at said first step;
    a third step of updating parallax data indicative of a parallax between said plural image data and the occlusion regions based on said correspondence relationship defined at said second step; and
    a fourth step of updating the probability density functions based on said parallax data and the occlusion regions updated at said third step.

2. The image processing method according to claim 1, wherein, at said second step, a difference cost between pixel values of the pixel data in said matchable regions and a penalty against the fact that each pixel data is determined to be pixel data in any of said occlusion regions are added to calculate said energy.

3. The image processing method according to claim 2, wherein, at said second step, said difference cost is calculated based on a difference between pixel values of the pixel data which correspond to each other between said plural image data.

4. The image processing method according to claim 2, wherein the second step comprises, where a first one of said pixel data of said first image data and a second one of said pixel data of said second image data correspond to each other, the steps of:
    producing pixel data around said first pixel data and said second pixel data by an interpolation process;
    specifying a first minimum value which is a minimum one of differences between said first pixel data and said second pixel data and the pixel data produced by said interpolation process for the second pixel data;
    specifying a second minimum value which is a minimum one of differences between said second pixel data and said first pixel data and the pixel data produced by said interpolation process for the first pixel data; and
    calculating said difference cost based on a smaller one of said first minimum value and said second minimum value.

5. The image processing method according to claim 2, wherein said second step comprises the steps of:
    dividing a calculation expression for an entropy, which is a factor for defining mutual correlation information, between the pixel data in said matchable regions and the pixel data in said occlusion regions of said plural image data into a first entropy calculation expression for the pixel data in the matchable region and a second entropy calculation for the pixel data in the occlusion region based on premises that the pixel data in the matchable regions and the pixel data in the occlusion regions are independent of each other and that the pixel data in the different matchable regions are independent of each other; and
    calculating said energy using said first entropy calculation expression as an evaluation method for said difference cost and using said second entropy calculation expression as an evaluation method for said penalty.

6. The image processing method according to claim 5, wherein said second step further comprises the steps of:
    producing an evaluation value for said difference cost based on a result of Taylor conversion of said first entropy calculation expression and application of non-parametric probability density function estimation to each term of a result of the Taylor conversion except a constant term or terms; and
    producing an evaluation value for said penalty based on a result of Taylor conversion of said second entropy calculation expression and application of non-parametric probability density function estimation to each term of a result of the Taylor conversion except a constant term or terms.

7. The image processing method according to claim 2, wherein, at said second step, a penalty arising from the fact that the parallax is different between pixel data at adjacent pixel positions in each of said plural image data is further added to calculate said energy.

8. An image processing method performed by an image processing circuit, comprising:
- a first step of producing a plurality of image data individually indicative of results of image pickup of a plurality of cameras;
- a second step of selecting a single probability density function from among a plurality of probability density functions each of which defines, for each of pixel data which form said plural image data produced at said first step, whether the pixel data belongs to a matchable region in which any pixel data corresponds to one of said pixel data in the other image data or an occlusion region in which any pixel data corresponds to none of said pixel data in the other image data;
- a third step of specifying a correspondence relationship in a unit of pixel data between said plural image data which minimizes the energy between said plural image data defined in accordance with said probability density function selected at said second step;
- a fourth step of updating parallax data indicative of a parallax between said plural image data and the occlusion regions based on said correspondence relationship defined at said third step;
- a fifth step of updating the probability density functions based on said parallax data and the occlusion regions updated at said fourth step; and
- a sixth step of combining said plural image data based on said plural image data produced at said first step and said probability density functions updated at said fifth step to produce composite image data.

9. An image processing apparatus, comprising:
- a probability density function selection section for selecting a single probability density function from among a plurality of probability density functions each of which defines, for each of pixel data which form a plurality of image data, whether the pixel data belongs to a matchable region in which any pixel data corresponds to one of the pixel data in the other image data or an occlusion region in which any pixel data corresponds to none of the pixel data in the other image data;
- a correspondence relationship specification section for specifying a correspondence relationship in a unit of pixel data between said plural image data which minimizes the energy representative of a correspondence relationship between said plural image data defined in accordance with said probability density function selected by said probability density function selection section;
- a parallax updating section for updating parallax data indicative of a parallax between said plural image data and the occlusion regions based on said correspondence relationship defined by said correspondence relationship specification section; and
- a probability density updating section for updating the probability density functions based on said parallax data and the occlusion regions updated by said parallax updating section.

10. The image processing apparatus according to claim 9, wherein said correspondence relationship specification section adds a difference cost between pixel values of the pixel data in said matchable regions and a penalty against the fact that each pixel data is determined to be pixel data in any of said occlusion regions to calculate said energy.

11. The image processing apparatus according to claim 10, wherein said correspondence relationship specification section calculate said difference cost based on a difference between pixel values of the pixel data which correspond to each other between said plural image data.

12. The image processing apparatus according to claim 10, wherein, where a first one of said pixel data of said first image data and a second one of said pixel data of said second image data correspond to each other, said correspondence relationship specification section
- produces pixel data around said first pixel data and said second pixel data by an interpolation process,
- specifies a first minimum value which is a minimum one of differences between said first pixel data and said second pixel data and the pixel data produced by said interpolation process for the second pixel data,
- specifies a second minimum value which is a minimum one of differences between said second pixel data and said first pixel data and the pixel data produced by the interpolation process for the first pixel data, and
- calculates said difference cost based on a smaller one of said first minimum value and said second minimum value.

13. The image processing apparatus according to claim 10, wherein said correspondence relationship specification section
- divides a calculation expression for an entropy, which is a factor for defining mutual correlation information, between the pixel data in said matchable regions and the pixel data in said occlusion regions of said plural image data into a first entropy calculation expression for the pixel data in the matchable region and a second entropy calculation for the pixel data in the occlusion region based on premises that the pixel data in the matchable regions and the pixel data in the occlusion regions are independent of each other and that the pixel data in the different matchable regions are independent of each other, and
- calculates said energy using said first entropy calculation expression as an evaluation method for said difference cost and using said second entropy calculation expression as an evaluation method for said penalty.

14. The image processing apparatus according to claim 13, wherein said correspondence relationship specification section
- produces an evaluation value for said difference cost based on a result of Taylor conversion of said first entropy calculation expression and application of non-parametric probability density function estimation to each term of a result of the Taylor conversion except a constant term or terms, and
- produces an evaluation value for said penalty based on a result of Taylor conversion of said second entropy calculation expression and application of non-parametric probability density function estimation to each term of a result of the Taylor conversion except a constant term or terms.

15. The image processing apparatus according to claim 10, wherein said correspondence relationship specification section further adds a penalty arising from the fact that the parallax is different between pixel data at adjacent pixel positions in each of said plural image data to calculate said energy.

16. A program, stored in a computer readable medium, for being executed by a computer, said program causing computer to execute:

a first procedure of selecting a single probability density function from among a plurality of probability density functions each of which defines, for each of pixel data which form a plurality of image data, whether the pixel data belongs to a matchable region in which any pixel data corresponds to one of the pixel data in the other image data or an occlusion region in which any pixel data corresponds to none of the pixel data in the other image data;

a second procedure of specifying a correspondence relationship in a unit of pixel data between said plural image data which minimizes the energy between said plural image data defined in accordance with said probability density function selected at said first step;

a third procedure of updating parallax data indicative of a parallax between said plural image data and the occlusion regions based on said correspondence relationship defined at said second step; and a fourth procedure of updating the probability density functions based on said parallax data and the occlusion regions updated at said third step.

17. A recording medium on or in which a program for being executed by a computer is recorded, said program causing said computer to execute:

a first procedure of selecting a single probability density function from among a plurality of probability density functions each of which defines, for each of pixel data which form a plurality of image data, whether the pixel data belongs to a matchable region in which any pixel data corresponds to one of the pixel data in the other image data or an occlusion region in which any pixel data corresponds to none of the pixel data in the other image data;

a second procedure of specifying a correspondence relationship in a unit of pixel data between said plural image data which minimizes the energy between said plural image data defined in accordance with said probability density function selected at said first step;

a third procedure of updating parallax data indicative of a parallax between said plural image data and the occlusion regions based on said correspondence relationship defined at said second step; and a fourth procedure of updating the probability density functions based on said parallax data and the occlusion regions updated at said third step.

* * * * *